L. F. SMITH.
Steam Cylinder Lubricators.
No. 140,958.          Patented July 15, 1873.
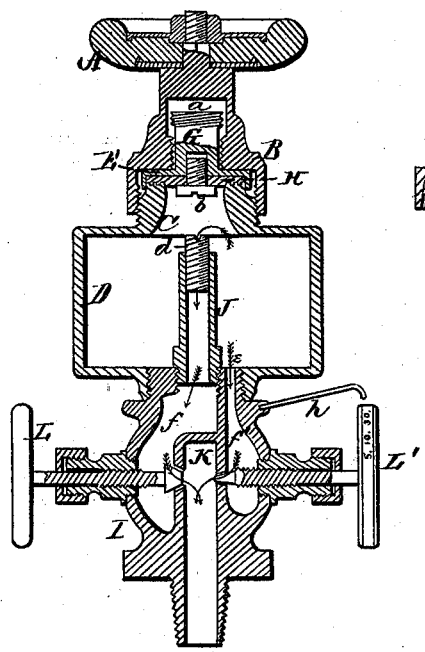
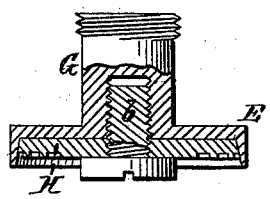
Witnesses:
Henry N. Miller
Ce. L. Curt
Inventor.
Levi F. Smith,
per
Alexander Mason
Attorneys.

UNITED STATES PATENT OFFICE.

LEVI F. SMITH, OF PHILADELPHIA, PENNSYLVANIA.

IMPROVEMENT IN STEAM-CYLINDER LUBRICATORS.

Specification forming part of Letters Patent No. 140,958, dated July 15, 1873; application filed June 6, 1873.

*To all whom it may concern:*

Be it known that I, LEVI F. SMITH, of Philadelphia, in the county of Philadelphia and in the State of Pennsylvania, have invented certain new and useful Improvements in Steam-Cylinder Lubricator; and do hereby declare that the following is a full, clear, and exact description thereof, reference being had to the accompanying drawings and to the letters of reference marked thereon making a part of this specification.

The nature of my invention consists in the construction and arrangement of a steam-cylinder lubricator having both a condensing and a positive feed, as will be hereinafter more fully set forth.

In order to enable others skilled in the art to which my invention appertains to make and use the same, I will now proceed to describe its construction and operation, referring to the annexed drawing, in which—

Figure 1 is a vertical section of my entire lubricator, and Fig. 2 is an enlarged section of a part of the same.

A represents the handle with stem and screw-socket B, to be screwed over the mouth C of the oil-reservoir D. In the stem B of the handle is formed a chamber, a, from which a passage leads down into the socket. This passage is of little smaller diameter than the chamber a, and has female screw-threads cut in it, as shown in Fig. 1. E represents an inverted cup or box, of such size as to fit in the bottom of the screw-socket on the stem B; and this cup or box is provided with a stem, G, to extend up through the screw-passage into the chamber a. Around the upper end of the stem G are raised screw-threads, as shown in Fig. 2, so that the stem can be screwed through the passage, and the threaded portion pass into the chamber a, where it will act as a flange or collar to prevent the cup E from falling out, and, at the same time, allow the whole handle to be turned without turning the cup. In the cup E is inserted a disk, H, of lead or other suitable soft material, which is held in the same by a screw, b, passing through the center of the disk, and up into the stem G. On the upper surface of the mouth C of the oil-reservoir are formed two seats, into which the soft-metal disk H enters when the handle is screwed on.

The handle being allowed to turn without turning the cup E, the soft-metal disk H will not wear out so fast as if it also turned on its seat. Furthermore, the walls of the cup E prevent the disk H from spreading, while, without said cup, the disk would spread and clog up the screw-threads in the socket of the stem B.

By this arrangement of the parts the soft-metal disk H will last much longer than it does ordinarily, the handle can be taken off for refilling the reservoir and put on again without disturbing the cup and disk, and when the disk is worn out it can readily be removed by unscrewing the screw b, and another inserted.

Into the bottom of the oil-reservoir D is screwed the globe I, from which a tube, J, extends up into the reservoir for a suitable distance; and in the upper end of this tube is screwed a hollow screw, d, for the purpose of elongating or contracting the tube J, according as it is desired to feed slow or fast when the condensing feed is used. At the bottom of the globe I is the usual screw shank or stem, to be screwed onto the steam-cylinder; and from this shank or stem a tube, K, extends up into the globe, said tube being closed at its upper end; and a partition runs up from said tube to one side of the lower end of the tube J, dividing the globe into two chambers, $f$ and $f'$. The tube J opens into the chamber $f$, while a passage, e, leads from the bottom of the oil-reservoir D to the chamber $f'$. On opposite sides of the tube K are formed two valve-seats for two valves, L and L', the former allowing communication between the chamber $f$ and the tube K, and the latter between the chamber $f'$ and the same tube.

If the valve L' is closed and the valve L opened, the steam will pass up into the oil-reservoir D and condense, thereby allowing the oil to flow over the upper end of the hollow screw d, and down, through the tube J, chamber $f$, and tube K, into the cylinder. When the oil has been used up the oil-reservoir D is full of water, which is readily drawn off by opening the valve L', when all the water and any oil that might remain will pass, through the passage e, chamber $f'$, and tube K, into the cylinder, thus obviating the necessity of a separate outlet for drawing off the water. When it is desired to use a positive feed in place of the condensing feed the valve L is closed, and the valve L' opened, more or less, when the oil will pass directly from the bottom of the reservoir, through the passage $e$, chamber $f'$, and tube K, to the cylinder.

The handle or disk of the valve L' is graduated, and an indicating-finger, $h$, is attached to the side of the globe, and pointing on said handle or disk, so that the valve may easily be set to feed from five to five hundred drops per minute, as desired.

Having thus fully described my invention, what I claim as new, and desire to secure by Letters Patent, is—

1. The combination of the stem B, with interior chamber $a$ of larger diameter than the screw-passage leading thereto, the stem G, with raised screw-threads on its upper end, the cup E, detachable disk H of soft metal, and the confining-screw $b$, all substantially as and for the purposes herein set forth.

2. The combination of the reservoir D, tube J, with hollow screw $d$, globe I, with tube K and chambers $f\ f'$, valves L L', and indicating-finger $h$, all constructed and arranged substantially as and for the purposes herein set forth.

In testimony that I claim the foregoing I have hereunto set my hand this 5th day of June, 1873.

LEVI F. SMITH.

Witnesses:
  A. N. MARR,
  C. L. EVERT.